April 21, 1931.   H. H. BAILEY   1,801,261
HOSE CLAMP
Filed Dec. 13, 1929

INVENTOR
Henry H. Bailey
BY
ATTORNEY

Patented Apr. 21, 1931

1,801,261

UNITED STATES PATENT OFFICE

HENRY H. BAILEY, OF OKLAHOMA CITY, OKLAHOMA, ASSIGNOR TO MECHANICAL ROYALTIES CORPORATION, OF OKLAHOMA CITY, OKLAHOMA, A CORPORATION OF OKLAHOMA

HOSE CLAMP

Application filed December 13, 1929. Serial No. 413,777.

My invention relates to hose clamps, and more particularly to a device of that character for connecting the fluid supply hose and drill pipe nozzle of rotary well drilling equipment; the principal object of the invention being to provide improved means for attaching the hose securely to the nozzle.

In accomplishing this object, I have provided improved details of structure, the preferred form of which is illustrated in the accompanying drawings, wherein.

Figure 1:
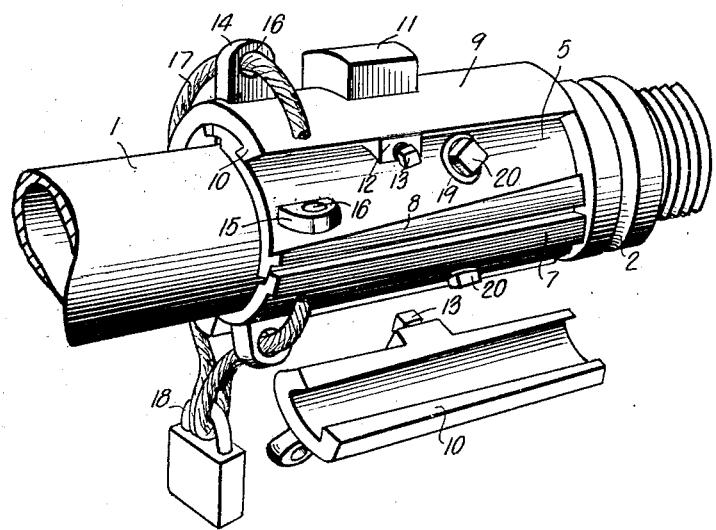
Fig. 1 is a perspective view of the hose clamp applied on a hose and nozzle, showing one of the bridge members removed.
Figure 2:
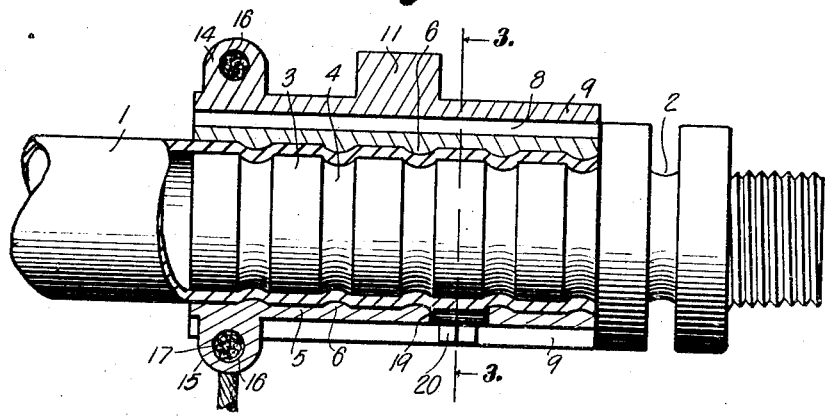
Fig. 2 is a central longitudinal section through the clamp, showing a nozzle and a hose secured in assembled relation by the clamp.
Figure 3:
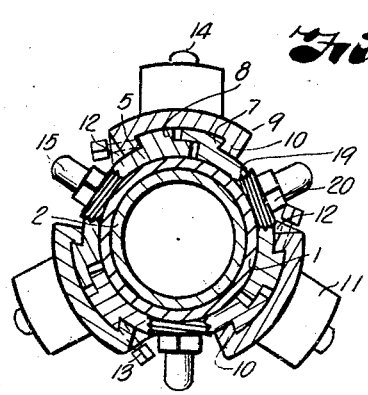
Fig. 3 is a transverse section on the line 3—3, Fig. 2.

Referring in detail to the drawings:

1 designates the end of a rubber hose and 2 a nipple, employed in rotary drilling equipment or for other purposes; the nipple including a tip 3 having spaced grooves 4, providing a corrugated external surface on the tip for cooperation with a corresponding internal corrugated surface on the clamp elements presently described.

5 designates sections of a longitudinally split sleeve curved on a radius to fit hose within a limited range of diameters, the sections of the sleeve having internal ring bosses 6 adapted to overlie grooves 4 on the nozzle tip for compressing the hose 1 into the grooves to effect a lock between the hose and nozzle when the clamp is assembled.

On one edge of each of the sleeve sections 5 is an offset rib 7 adapted to overlie the edge of an adjacent sleeve section, and on the outer face of each sleeve section adjacent the side opposite the offset rib is an inset rib 8, both the ribs 7 and 8 being undercut and tapered from one end of the sleeve to the other to provide a wedge-shaped tongue for a purpose presently described.

9 designates bridge members curved transversely on substantially the same radius as the sleeve sections and having inturned edge ribs 10 adapted for projection under the ribs 7 and 8 of the sleeve section to form dovetail tongue and groove joints between the bridges and paired ribs on the sleeve sections, the bridge ribs 10 being inclined to form a wedge-shaped groove so that the bridges may cooperate with the sleeve ribs to draw the sleeve sections together and compress them on the enclosed hose.

Each of the bridge members is provided with a boss 11, providing a striking surface for facilitating driving of the bridges to place during the assembly operation, and 12 designates bosses on the sides of the bridges through which set screws 13 may be projected into contact with the ribs of the sleeve sections to lock the bridges in place.

As it is important to maintain the connection between the hose and drill pipe, I provide additional means for locking the bridges to the sleeve, consisting of ears 14 on the bridges and ears 15 on the sleeve sections, having apertures 16 through which a hobble line 17 may be extended; the hobble line having provision for a padlock 18, whereby its ends may be securely connected together.

As the clamp may be used for connecting hose of a type from which branch lines may be tapped, I preferably provide one or more of the sleeve sections with a tapping aperture 19 which, under ordinary use, may be closed by a plug 20.

Assuming the clamp to be constructed and assembled as described, and the tip of a nozzle extended into the end of a hose which is to be connected to the nozzle by the clamp, the sleeve sections are assembled about the end of the hose and the bridges slipped over the tongues of the sleeve sections and driven therealong to contact the sleeve sections and form a firm binding connection between the end of the hose and the nozzle tip.

When the bridges have been positioned as described, they are locked to the sleeve by the set screws 13 and, if desired, a hobble line may be run through the ears 14 and 15 of the bridge and sleeve members and locked to prevent displacement of the bridges from the sleeve.

What I claim and desire to secure by Letters Patent is:

1. A hose clamp including a longitudinally split sleeve having tapered ribs, bridge members cooperative with ribs on adjacent sleeve sections to contract the sleeve sections and retain said sections in assembled relation, and an annular hobble for retaining the bridges in set relation to the sleeve sections.

2. A hose clamp including a longitudinally split sleeve having ribs inset from the side edges of the sleeve section and ribs on the other side edges of said sections overlying the edges of adjacent sections and cooperating with inset ribs of said adjacent sections to form tongues, and bridges having side ribs cooperating with the sleeve ribs to unite the sleeve sections.

3. A hose clamp including a longitudinally split sleeve having ribs inset from side edges of the sleeve sections and ribs on the other side edges of said sections overlying the edges of adjacent sections and cooperating with inset ribs of said adjacent sections to form tongues, bridges having side ribs cooperating with the sleeve ribs to unite the sleeve sections, ears on the sleeve sections and bridges adapted for alignment when the clamp is assembled, and a hobble line extended through the ears to retain the sleeve sections and bridges in assembled relation.

4. A hose clamp including a longitudinally split sleeve, an offset tapered rib on one edge of each section, an inset tapered rib near the opposite edge of each section and adapted to cooperate with the offset rib of an adjacent section to form a wedge shaped tongue, and bridges having tapered grooves receiving the tongues to contract said sleeve sections and retain the sections in assembled condition.

5. In combination with a nozzle having spaced grooves, a hose clamp including a longitudinally split sleeve having spaced internal ring bosses adapted to overlie said grooves, an offset rib on one edge of each section, an inset rib near the opposite edge of each section and adapted to cooperate with the offset rib of an adjacent section to form a tongue, and bridges having side ribs cooperating with the sleeve ribs to unite the sleeve sections.

6. In combination with a nozzle having spaced annular grooves, a hose clamp including a longitudinally split sleeve having spaced internal ring bosses adapted to overlie said grooves, an offset tapered rib on one edge of each section, an inset tapered rib near the opposite edge of each section and adapted to cooperate with the offset rib of an adjacent section to form a wedge-shaped tongue, and bridges having tapered grooves receiving the tongues to contract said sleeve sections and retain the sections in assembled condition.

In testimony whereof I affix my signature.

HENRY H. BAILEY.